United States Patent [19]

Henschen et al.

[11] Patent Number: 5,358,426
[45] Date of Patent: Oct. 25, 1994

[54] CONNECTOR ASSEMBLY FOR DISCRETE WIRES OF A SHIELDED CABLE

[75] Inventors: Homer E. Henschen, Carlisle; Joseph M. Pawlikowski, Lancaster, both of Pa.

[73] Assignee: The Whitaker Corporation, Wilmington, Del.

[21] Appl. No.: 61,609

[22] Filed: Apr. 29, 1993

Related U.S. Application Data

[63] Continuation-in-part of Ser. No. 884,791, May 18, 1992, Pat. No. 5,211,578.

[51] Int. Cl.⁵ ............................................. H01R 9/07
[52] U.S. Cl. ............................................. 439/497; 439/610
[58] Field of Search .................... 439/492–499, 439/607, 609, 610, 578–585

[56] References Cited

U.S. PATENT DOCUMENTS

| 3,951,492 | 4/1976 | Braund | 439/494 |
|---|---|---|---|
| 4,236,779 | 12/1980 | Tang | 339/143 R |
| 4,256,945 | 3/1981 | Carter et al. | 219/10.75 |
| 4,596,432 | 6/1986 | Tighe, Jr. | 339/107 |
| 4,623,401 | 11/1986 | Derbyshire et al. | 148/13 |
| 4,626,767 | 12/1986 | Clappier et al. | 323/280 |
| 4,659,912 | 4/1987 | Derbyshire | 219/535 |
| 4,679,868 | 7/1987 | Hasircoglu | 439/495 |
| 4,682,828 | 7/1987 | Piper et al. | 439/92 |
| 4,695,712 | 9/1987 | Busch | 219/535 |
| 4,713,023 | 12/1987 | Bixler et al. | 439/610 |
| 4,773,878 | 9/1988 | Hansell, III | 439/610 |
| 4,789,767 | 12/1988 | Doljack | 219/9.5 |
| 4,852,252 | 8/1989 | Ayer | 29/860 |
| 4,871,319 | 10/1989 | Babow | 439/77 |
| 4,935,284 | 6/1990 | Puerner | 428/137 |
| 5,009,616 | 4/1991 | Fogg et al. | 439/608 |
| 5,052,949 | 10/1991 | Lopata et al. | 439/610 |
| 5,080,604 | 1/1992 | Rider et al. | 439/492 |
| 5,190,473 | 3/1993 | Mroczkowski et al. | 439/580 |

*Primary Examiner*—David L. Pirlot
*Attorney, Agent, or Firm*—Anton P. Ness

[57] ABSTRACT

A connector (10) having two rows of signal terminals (20) easily terminated to conductors (106) of discrete wires (14) and including an integral shield ground (40) to ground the shielding braid (16) of the cable (12). A wire-carrying subassembly (130) having the discrete wires secured thereto is moved against the rear (36) of the front housing member (30) to place stripped conductor portions (108) of the wires adjacent the rear terminal sections (28) for termination. The wire-carrying subassembly (130) includes a body member (50) having a wire-receiving region along a forward edge in which ends of the wires will be secured, and a conductive shield ground section (40) having one or two rearward extensions (42) having tabular end portions (44) for termination to the cable braid (16), and one or two ground contact sections (48) extending forwardly to be terminated to a ground terminal of the connector subassembly.

13 Claims, 8 Drawing Sheets

CONNECTOR ASSEMBLY FOR DISCRETE WIRES OF A SHIELDED CABLE

RELATED APPLICATION INFORMATION

This application is a Continuation-in-Part of U.S. patent application Ser. No. 07/884,791 filed May 18, 1992 now U.S. Pat. No. 5,211,578.

FIELD OF THE INVENTION

The present invention relates to the field of electrical connectors and more particularly to connectors for application to multiple wires of a shielded cable.

BACKGROUND OF THE INVENTION

Many electrical connectors are commercially available which are applied to a multiplicity of discrete cables, having an array of electrical terminals extending through passageways of the housing from terminations to the conductors of the wires forwardly to contact sections at least exposed across the mating face of the connector housing for mating with corresponding terminals of a mating connector. Commonly application apparatus for assembling such connectors to the wires utilizes tooling which is relatively complex in order to handle the end portions of the discrete wires for precise placement, and commonly the terminals are applied to the wires by crimping after which the thus-terminated wires are moved axially forwardly for the terminals to be extended through the passageways of the housing until fully seated therewithin.

In another approach, for multistrand conductors of 28 AWG twisted pair wires of a bundled cable, the stripped conductors of the plurality of wires are soldered to traces of a paddle card or transition card, which traces extend to a common forward edge and are then soldered to terminals of a connector for electrical connection thereto, and cover members are secured thereover. Similar such arrangements are disclosed in U.S. Pat. Nos. 4,679,868 and 4,682,828. In a variation of this arrangement, U.S. Pat. No. 4,871,319 discloses a molded paddle card whereon discrete traces extend from the forward card edge to molded wire-receiving grooves adapted to receive stripped wire ends thereinto for soldering, after which the paddle card is fastened to a connector having terminals secured therein solderable to the card's traces.

In U.S. Pat. No. 5,190,473 an array of microcoaxial conductors are terminated to a connector, with the discrete outer conductors soldered to respective nests of a common ground plate which includes several contact sections extending to the mating face of the connector, while the discrete inner conductors are terminated to respective signal contacts secured in the connector housing and extending to the mating face.

It is desired to provide a method of terminating a plurality of insulated small gage stranded wires of a shielded cable and assembling a connector thereto, including a means for grounding the cable shield.

It is desired to provide a housing assembly having components which are adapted for receipt of the discrete wire ends and further handling thereof as a unit during solder termination, and also provide inherent means for grounding the cable shield.

SUMMARY OF THE INVENTION

In the present invention a body member of the housing includes an array of axially extending grooves defined on each side surface thereof for receipt of wire ends moved thereinto from laterally of the side surface, a planar front support ledge extending just forwardly of the groove array, and a planar rear support section extending from rearward ends of the grooves to a rearward end. Positioned just forwardly and rearwardly of the wire-receiving grooves extending outwardly from each lateral end of the planar front support ledge and rear support section of the body member are a pair of forward and rearward apertured mounting flanges. A pair of forward clamping bars and a pair of rearward clamping bars will be assembled to the body member when securing the wire ends in the respective grooves, the clamping bars having projections at each end adapted to be received through the corresponding apertured mounting flange in an interference fit.

Each wire end is prepared by carefully slitting the insulation around the conductor at a selected distance from the end, moving the slitted insulation piece along the conductor and remaining partially thereon, forwardly to expose a selected length of the conductor, after which that portion of the insulation piece forwardly of the conductor end is severed. The prepared wire ends are then positioned in respective grooves of the body member with the exposed conductor length disposed within and along the respective groove, the insulated end portion disposed along a ledge of the body member forwardly of the groove array, a clamping bar mounted onto the body member clamping the insulated wire ends against the ledge, the insulated remaining portions of the wire disposed along the planar rear support surface and a clamping bar mounted onto the body member clamping the insulated wire thereagainst, all defining a wire carrier manipulatable as a unit for remaining assembly steps and wire termination.

The terminals are stamped and formed from a blank and initially retained integrally joined to a carrier strip defining a lead frame, one such lead frame for the upper row and a second for the lower row. Contact sections of the terminals of both rows are inserted forwardly through passageways of a common transverse front cover member until widened body sections of the terminals are disposed within the passageways in an interference fit, thus defining a connector subassembly. Intermediate sections of the terminals of the lead frames exit the rearward ends of the passageways and initially diverge from the medial plane of the front cover member dividing the rows, then extend axially and then begin converging toward the intermediate sections of the terminals of the other lead frame, to axially extending wire termination sections of the terminals. Rear sections of the terminals diverge from the termination sections to frangible sections joining the terminals to the respective carrier strip of the lead frame.

As disclosed in U.S. Pat. No. 5,211,578, the wire carrier can now be moved axially forwardly between the lead frames secured to the front cover member, with chamfered forward edges of the forward clamping bars initiating outward deflection of the lead frames upon engagement with the rear terminal sections. The wire terminations sections of the terminals ride over the forward clamping bar until therepast, resiling into respective ones of the grooves of the body member and press against the exposed conductor portion lying therealong. Preferably a preform of solder is disposed along the groove bottom surfaces prior to clamping of the wires to the body member. Also, preferably, the carrier strips of the terminal lead frames each define a Curie point heater or self-regulating temperature source by including an incremental layer of magnetic material intimately joined to the copper alloy of the lead frame; such a Curie point heater when subjected to radio frequency current of constant amplitude induced therein, will generate thermal energy to reflow the solder after flux is applied. Thereafter, the carrier strips are broken off defining discrete circuits. After soldering and carrier strip removal, additional insulative covering can be applied if desired; for example the flanges of the forward and rearward clamping bars and the associated mounting flanges of the body member can include aligned mounting apertures into which projections of outer cover members can be inserted in interference fit.

Integrally affixed to the body member is a ground plate including at least one rearward extension to coextend along a portion of the exposed cable shielding braid to be soldered thereto, and at least one ground contact section extending forwardly in a groove to be exposed therewithin for electrical connection to a terminal of the connector subassembly in the same manner as a wire conductor, for grounding the cable shield. The ground plate is preferably insert molded as an integral portion of the body member and includes a layer of magnetic material along a surface portion thereof to define a Curie point heater enabling achievement of a desired temperature in the one or more extensions sufficient for melting solder when subjected to RF current, to create a solder joint between the rearward extensions and the cable shield.

The connector subassembly/wire carrier is thus especially adapted to facilitate not only handling of a plurality of terminals and handling of a plurality of discrete wires, but also soldering of the wires to the terminals, especially valuable for terminating multistrand conductors.

It is an objective of the present invention to provide a connector assembly adapted to facilitate handling of discrete wires with minimal complex tooling.

It is also an objective to provide such an assembly adapted for handling a plurality of terminals prior to termination to respective wires.

It is an additional objective to provide such an assembly adapted for soldering of conductors of discrete wires to respective terminals after connector assembly.

It is further an objective to provide such an assembly with inherent internal means for grounding the shielding braid of the cable.

Embodiments of the present invention will now be described by way of example with reference to the accompanying drawings.

DETAILED DESCRIPTION OF THE PREFERRED EMBODIMENTS

Figure 1:
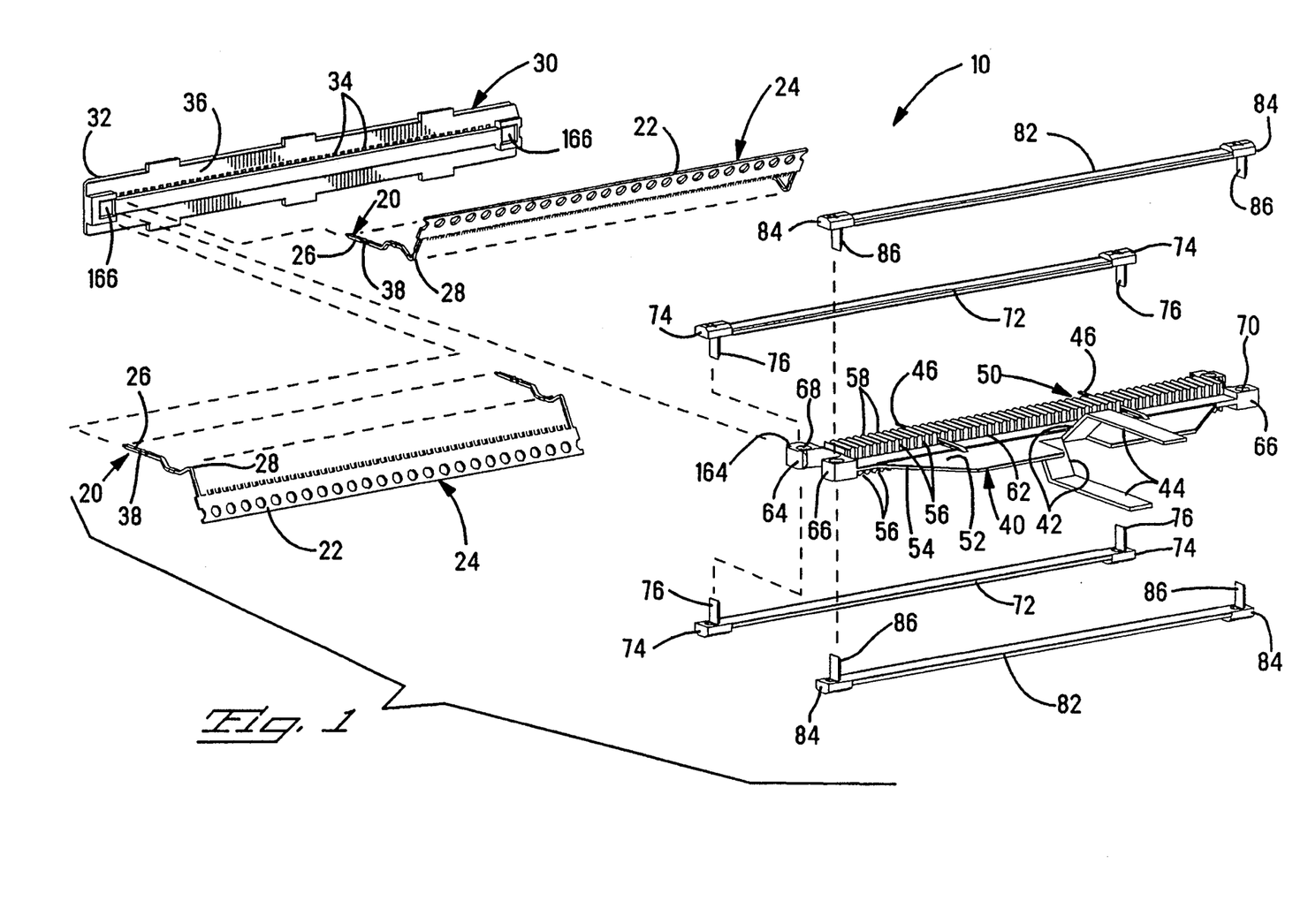
FIG. 1 is an isometric exploded view of an electrical connector including the integral shield ground of the present invention.
Figure 4:
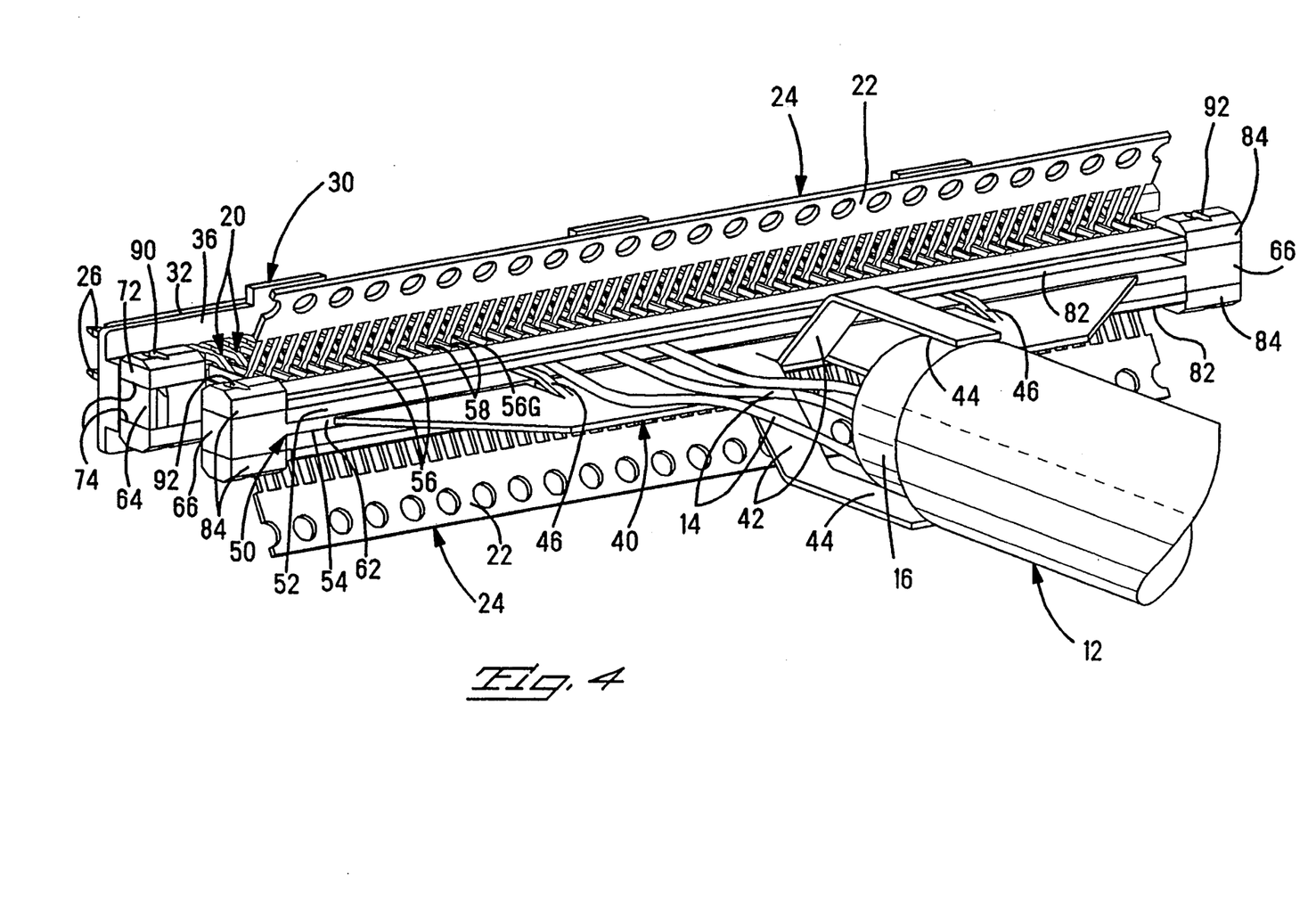
FIG. 4 is an isometric view of the assembled connector showing a shielded multiwire cable with representative discrete wires extending therefrom and terminated in the connector, and the shield ground including a pair of rearward extensions coextending along an exposed end portion of the cable's shielding braid, and a pair of ground contact sections extending forwardly.
Figure 7:
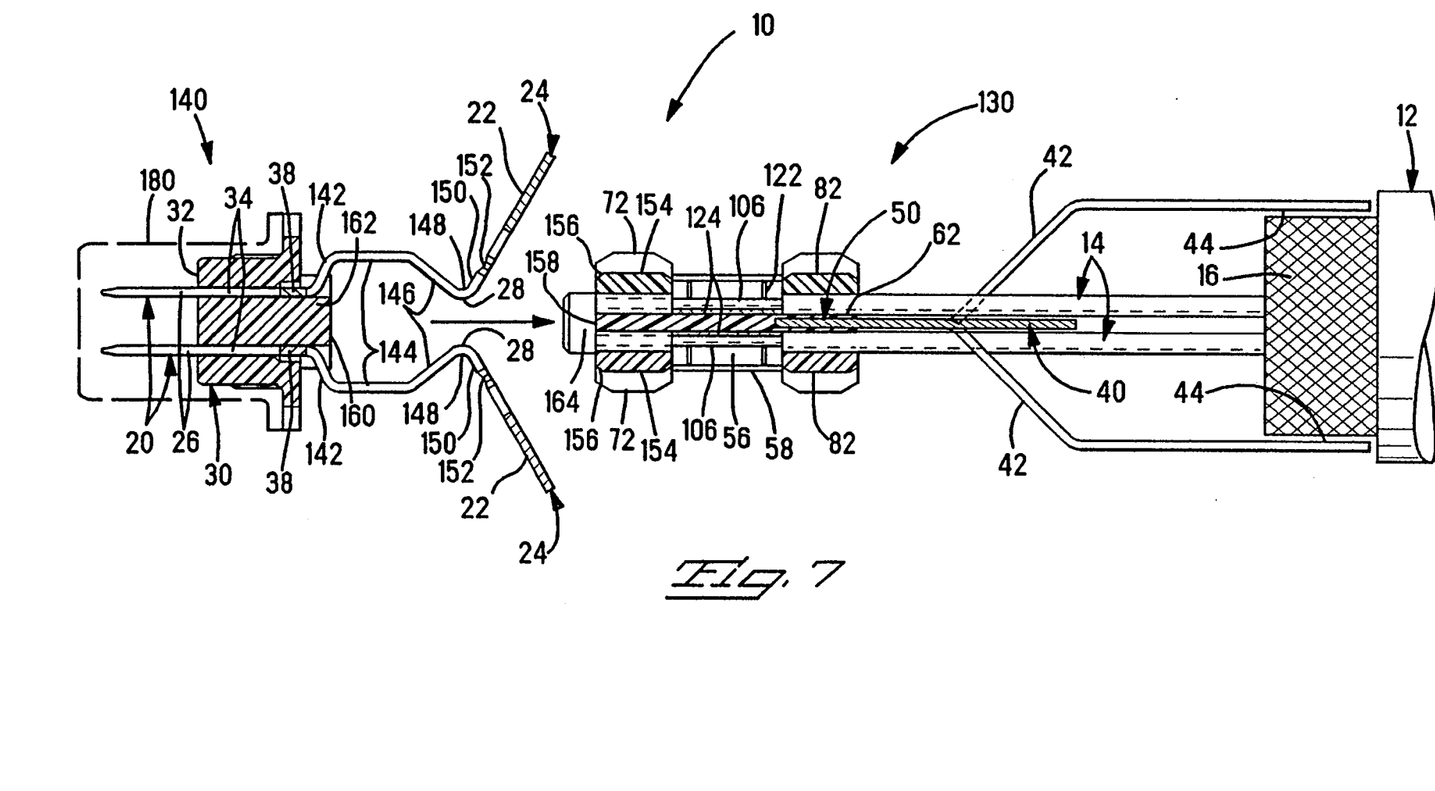
FIGS. 7 to 9 are longitudinal section views illustrating assembling of the wire carrier subassembly to the connector subassembly showing the shield ground extensions adjacent the cable shield, with FIG. 9 also showing placement of the coil of an RF apparatus therearound for activating the Curie point heater defined on the terminal carrier strips, and also removal of a carrier strip after soldering is completed.
Figure 8:
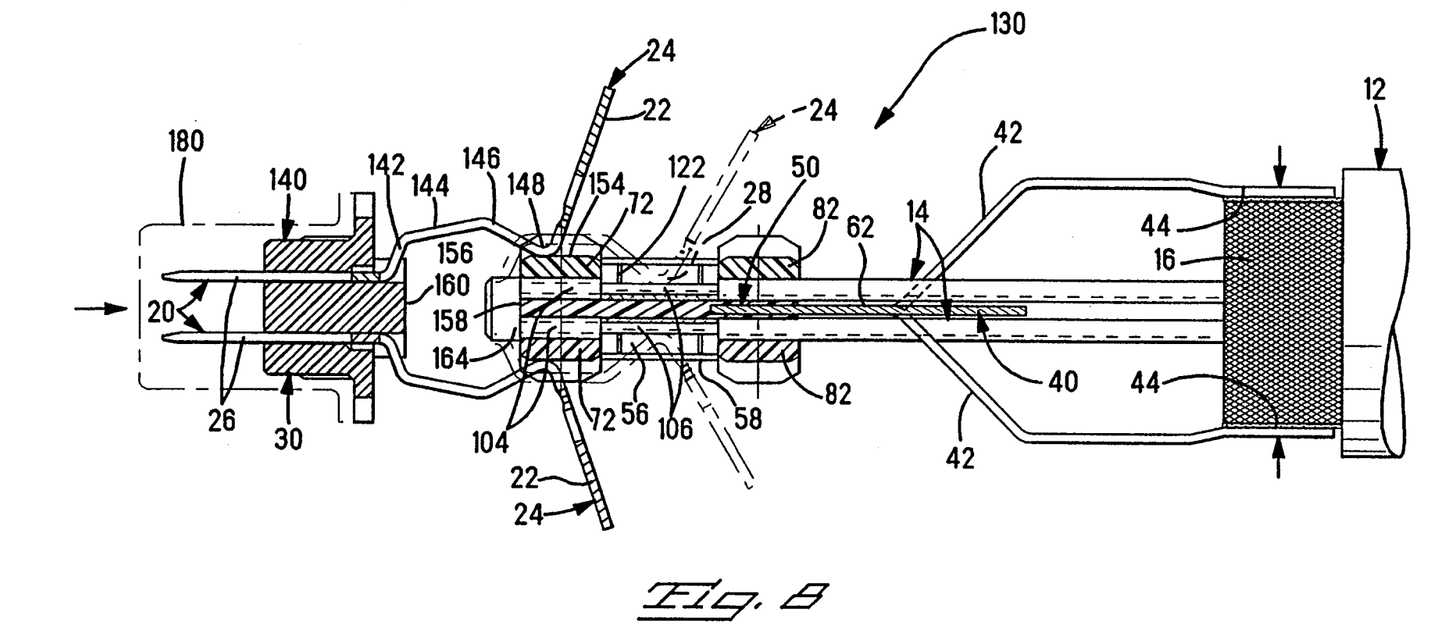
Figure 9:
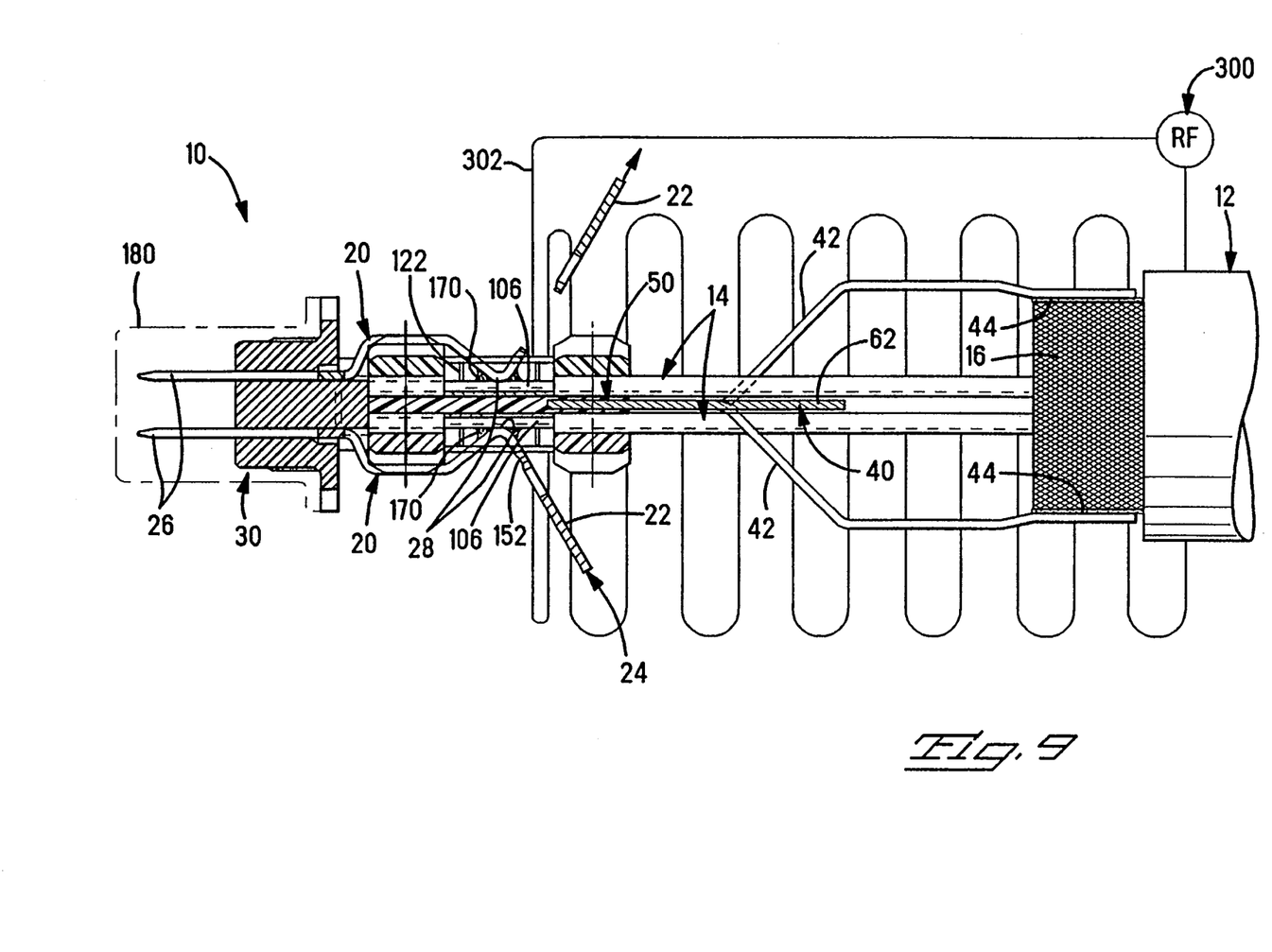

FIG. 1 illustrates the components of connector assembly 10, which are assembled in FIG. 4 and about to be terminated by soldering to an array of discrete wires 14 such as 28 AWG twisted pair wires extending from a bundled cable 12. Shield braid 16 of cable 12 is exposed for termination to the shield ground of the present invention. Wires 14 may have solid strand conductors, or they may have multistrand conductors for which the present invention is especially suitable. Terminals 20 for the respective conductors of wires 14 are arranged in two rows, and the terminals of each row initially are joined at their rearward ends to a carrier strip 22 two define a lead frame 24. Terminals 20 each have a contact section 26 at the forward end thereof and a termination site 28 near the carrier strip 22. Front cover member 30 is essentially a transverse member the forward surface of which defines the connector mating face 32, and includes passageways 34 extending from the mating face to a rearwardly facing surface 36 and having entrances adapted to receive the contact sections of the respective terminals insertably therethrough and widened body sections 38 of terminals 20 in interference fit therewithin to define a connector subassembly 140 (FIGS. 7 to 9).

Body member 50 includes upwardly facing surface 52 and downwardly facing surface 54 each having an array of wire-receiving grooves 56 disposed laterally therealong separated by barrier walls 58. Extending forwardly from the arrays of grooves is a front support ledge 60; extending rearwardly from the arrays of grooves is a rear support section 62. Laterally of front support ledge 60 (see FIGS. 6 to 9) and rear support section 62 extend front and rear mounting flanges 64,66 respectively each having at least one projection-receiving aperture 68,70 extending vertically therethrough respectively. Associated with front support ledge 60 are upper and lower forward clamping bars 72 having flanges 74 at respective ends thereof from which depend mounting projections 76 such as semicylindrical legs adapted to be received into respective projection-receiving apertures 68 in an interference fit. Similarly, associated with rear support section 62 are upper and lower rearward clamping bars 82 having flanges 84 at respective ends thereof from which depend mounting projections 86 such as semicylindrical legs adapted to be received into respective projection-receiving apertures 70 in an interference fit. Forward and rearward clamping bars 72,82 may be identical as shown.

Figure 2:
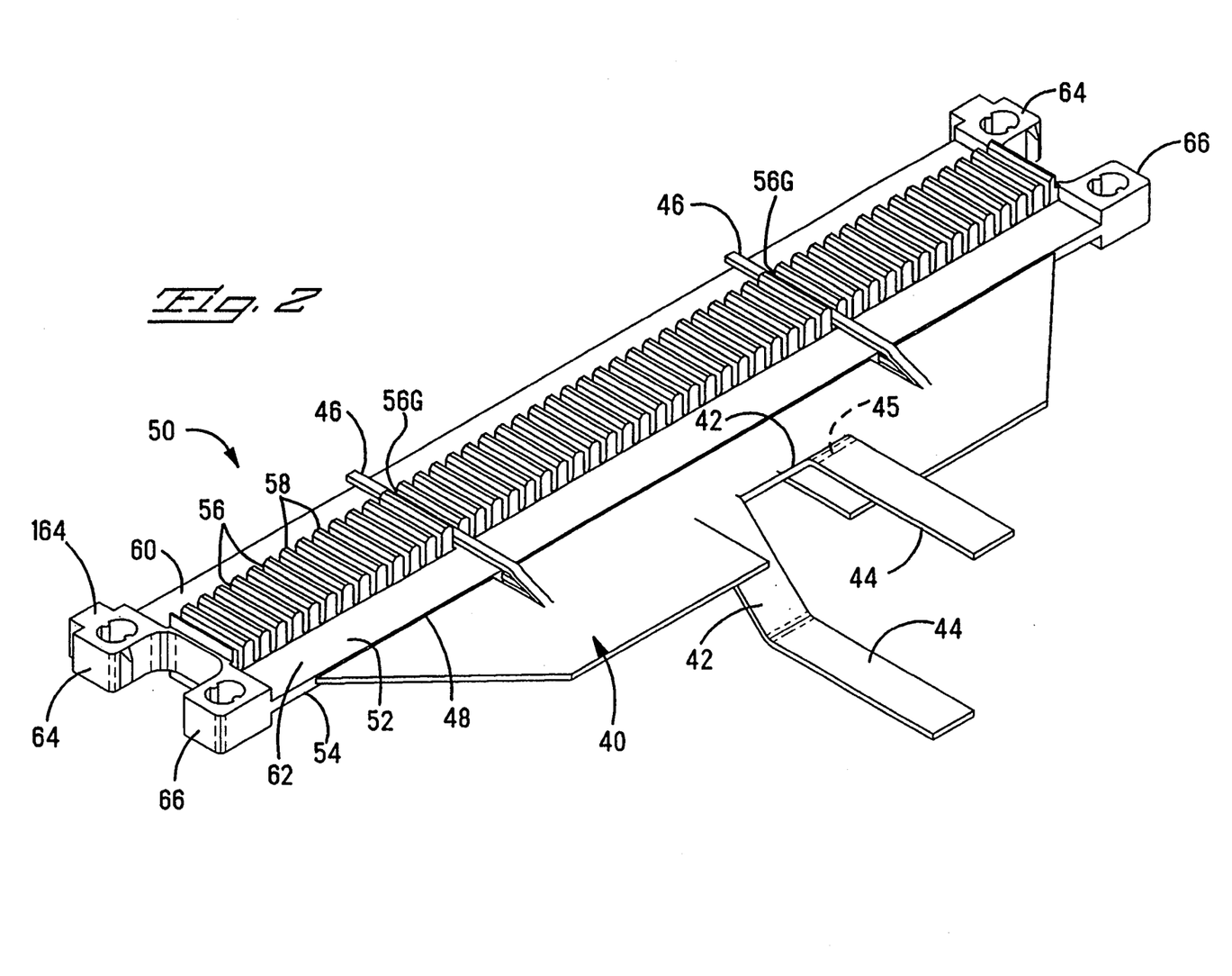
FIG. 2 is an enlarged isometric view of the body member of the connector of FIG. 1 containing the shield ground.
Figure 3:
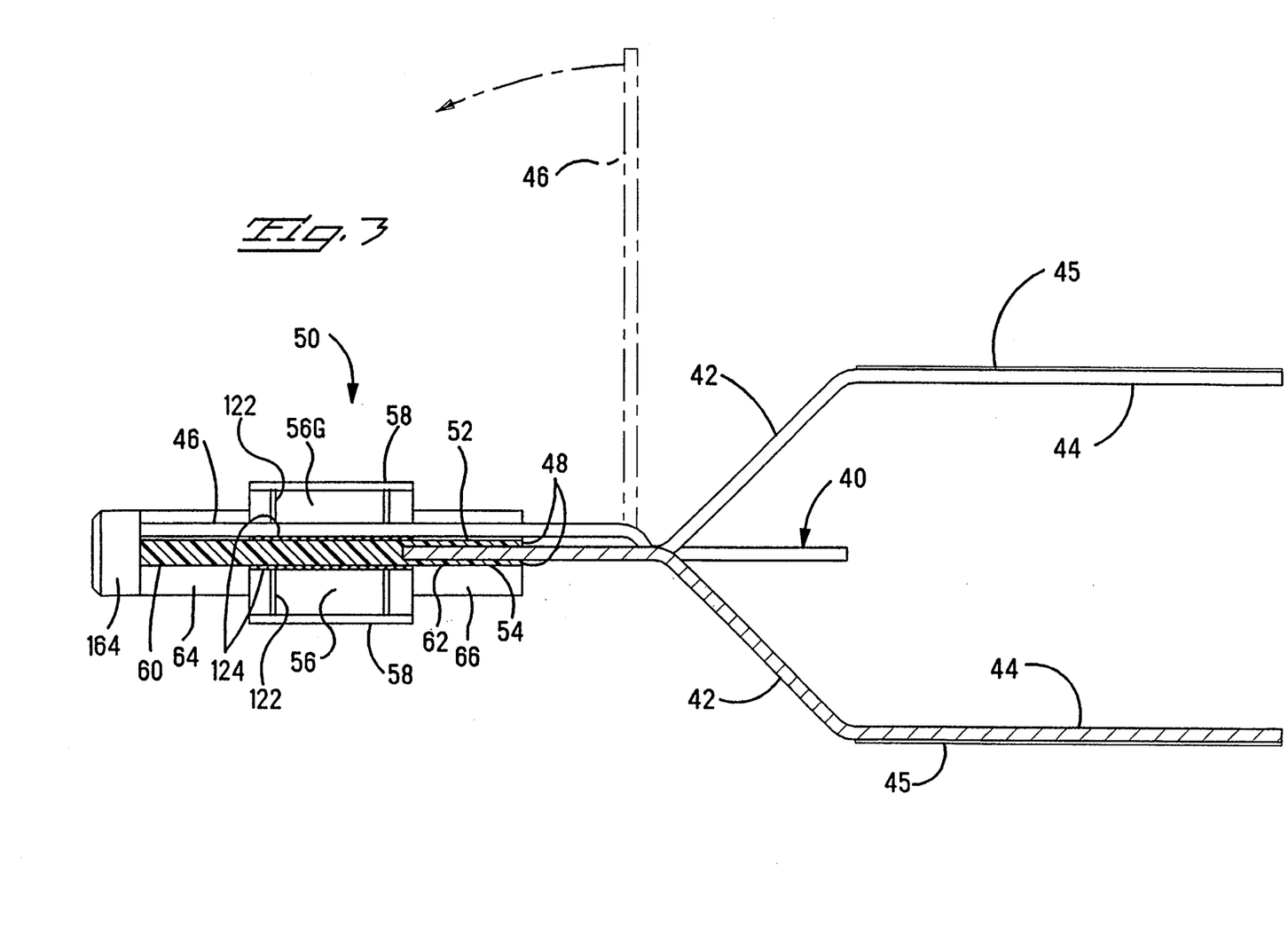
FIG. 3 longitudinal section view of the body member of FIG. 2.

A shield ground member 40 is shown to be integrally affixed to body member 50, with reference now to FIGS. 2 and 3. A planar portion extends rearwardly from rear support section 62, for example, and is shown to include a pair of rearward extensions 42 extending relatively upwardly and downwardly from the plane of body member 50 to tabular end portions 44 which will coextend along an exposed end portion of shield braid 16 of cable 12 which will become electrically connected therewith such as preferably by soldering. Two ground contact sections 46 are shown which eventually extend forwardly for receipt into associated ground-receiving grooves 56G to be exposed therein for continuation of the ground with ground circuits of the mating connector (not shown).

Preferably body member 50 is insert molded to shield ground member 40, and may be mechanically secured thereto such as by a lip portion 48 being molded to extend along top and bottom surfaces of a forward edge portion of shield ground member 40, as well as a bonding agent optionally utilized to adhere the plastic resin to the metal of the shield ground member 40. Ground contact sections 46 may be initially bent to extend orthogonally outwardly during the insert molding of the plastic portion of body member 50 to shield ground member 40, and afterward bent forwardly to be disposed along the bottom of the associated groove 56G. Shield ground member 40 may be stamped and formed for example of Copper Alloy No. C102, which has low electrical resistance and low magnetic permeability. Also, to facilitate the soldering of tabular portions 44 to shield braid 16, a thin layer of magnetic material such as Alloy 42 (42 percent nickel, 58 percent iron) and a thickness of between about 0.0003 and 0.0007 inches, may be clad onto shield ground member 40 and having high electrical resistance and high magnetic permeability, to define a Curie point heater. The layer of magnetic material is shown to be disposed in regions 45 (FIG. 2), which may be located on outwardly facing surfaces of tabular portions 44.

Preferably, referring to FIG. 4, the superposed mounting flanges 74,64,74 and 84,66,84 additionally define together second apertures 90,92 whereinto may be inserted projections of outer upper and lower dielectric cover members (not shown) having mounting projections adapted to be received thereinto in interference fit, after all assembly and soldering has been performed. Additionally, rear support section 62 may include apertures by which cable strain relief clamps (not shown) or rear shell members (not shown) may be mounted thereto.

Figure 5:
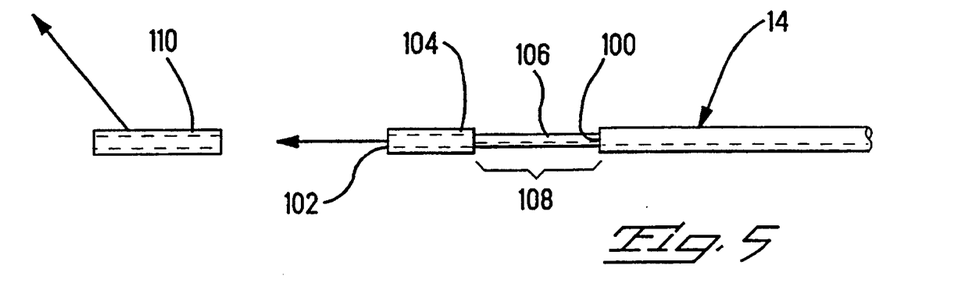
FIGS. 5 and 6 are elevation views illustrating the preparation of a wire an assembling of the wire to the organizer of the present invention.

The preparation of a wire 14 is illustrated in FIG. 5. Each wire 14 is prepared by carefully slitting insulative jacket 100 thereof at a selected location inward from end 102 thereof, and the thus-loosened piece 104 is slid partially forwardly along conductor 106 exposing a portion 108 of conductor 106 having a selected length. The portion 110 of the insulation piece 104 forwardly of end 102 is removed, retaining a remnant of piece 104 on the end of conductor 106.

Figure 6:
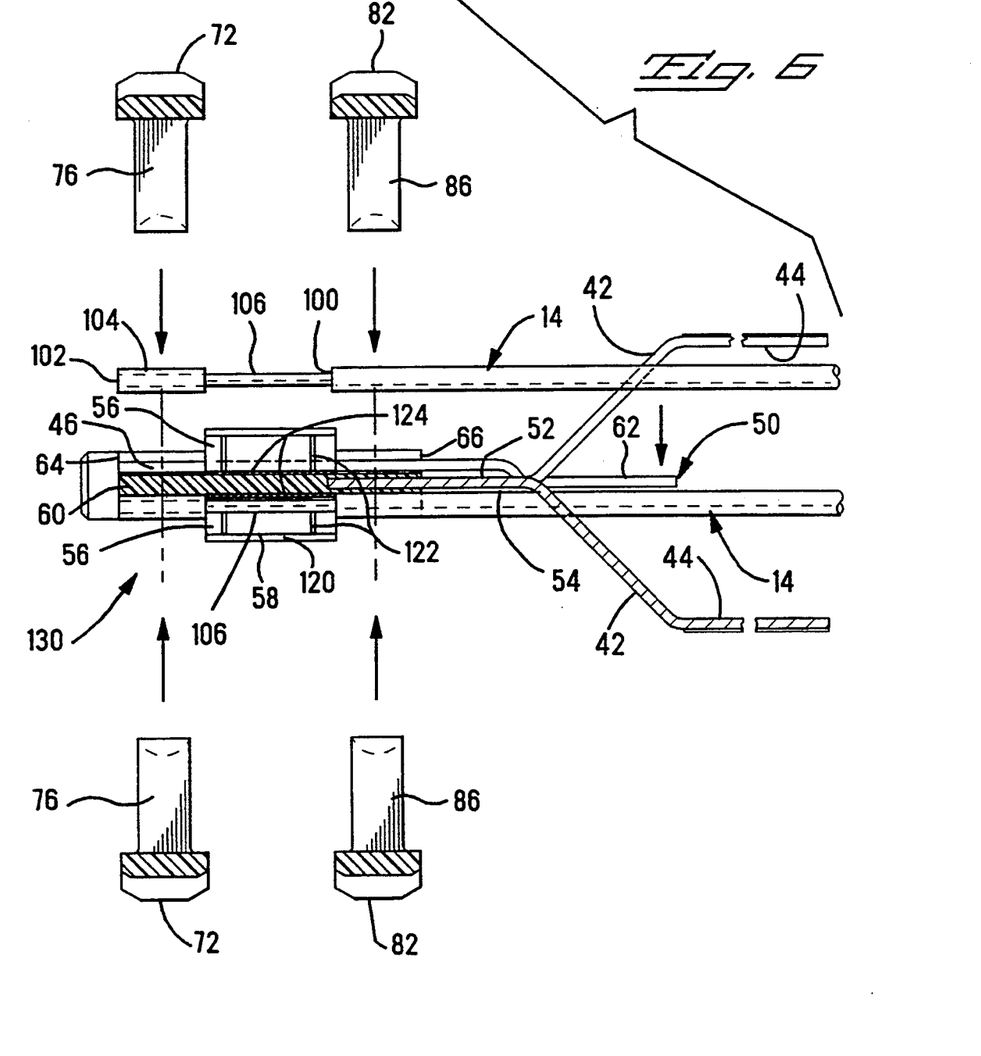

The securing of wires 14 to body member 50 is shown in FIG. 6 following preparation. Exposed conductor portion 108 is aligned with a corresponding groove 56, with insulative piece 104 beside front support ledge 60 and the insulatively jacketed remainder of wire 14 extending along rear support section 62. No wires 14 will be placed into ground-receiving grooves 56G containing ground contact sections 46. Chamfered outer edges 120 of barrier walls 58 are adapted to receive conductor portions 108 appropriately into groove 56 until the wire insulation forwardly and rearwardly of portion 108 abuts the surface of body member 50 along front support ledge 60 and rear support section 62. Preferably vertical rib sections 122 are formed along side surfaces of walls 58 to assist in centering wire conductors 106 within grooves 56. Previously disposed along the bottom surface of each groove 56 is an amount of solder or solder paste 124. When all wires 14 are positioned appropriately along respective grooves 56 and with ground contact sections 46 along grooves 56G, upper and lower front clamping bars 72 are mounted onto body member 50 outwardly of front support ledge 60 with projections 76 entering apertures of mounting flanges 64; and upper and lower rear clamping bars 82 are similarly mounted onto body member 50 outwardly of rear support section 62 immediately rearwardly of barrier walls 58 all defining a wire subassembly or carrier 130 (FIG. 7).

FIGS. 7 to 9 illustrate the assembling of wire carrier 130 to connector subassembly 140, which is shown to have a metal shroud 180 (in phantom) conventionally secured to front cover member 130 as preferred to which a pair of rear shell members (not shown) will be fastened upon final connector assembly after soldering. Each terminal 20 of each lead frame 24 includes an intermediate section extending rearwardly from body section 38 and exiting a respective passageway 34 of front cover member 30, with a first portion 142 diverging outwardly from the median of subassembly 140, a second portion 144 extending axially, and a third portion 146 converging to wire termination section 28 at acute bend 148. Rear section 150 includes a frangible section 152 initially joining terminal 20 to carrier strip 22. Together the wire termination sections 28 of the terminals of the upper and lower lead frames 24 define a constriction having an opening dimensioned less than the distance between the outwardly facing surfaces 154 of upper and lower front clamping bars 72 of wire carrier 130. Preferably outwardly facing surfaces 154 have at least their forward edges 156 chamfered, and upon wire carrier 130 being moved axially between the lead frames bearing engagement between chamfered edges 156 and rear terminal sections 150 of both lead frames initiates outward deflection of the lead frames.

In FIG. 8 can be seen an intermediate position during assembly, with lead frames 24 deflected or pried apart as wire termination sections 28 ride over outwardly facing surfaces 154 of forward clamping bars 72. Shown in phantom is the final position of wire termination sections 28 after receipt into corresponding grooves 56 and engagement with corresponding conductors 106 of wires 14 after the deflected terminal portions resile, or engagement with ground contacts sections 46 in grooves 56G which results in the particular terminals 20 being ground terminals. It is preferred that the lead frames 24 and front cover member are so shaped and dimensioned that the wire engagement sections 28 will apply spring bias against the conductors (or ground contact sections) in the final position, thus assuring optimum conditions for soldering therebetween.

Referring to FIGS. 8 and 9, forward surface 158 of the front support ledge in common with the forward surfaces of clamping bars 72 and insulation pieces 104 abut the rearwardly facing surface 160 of flange 162 of front cover member 30; embossments 164 extend forwardly from body member 50 at each lateral end to enter corresponding holes 166 along rearward face 36 of front cover member 30 (FIG. 1). Termination section 28 of each terminal 20 is spring loaded against a corresponding conductor 106 of wire 14 (or ground contact section 46). The assembly is placed within a coil 302 of an apparatus 300 for generating radiofrequency current of constant amplitude such as 13.56 mega-Hertz, with the coil preferably surrounding both the termination sections 28 of terminals 20 and the regions 45 of shield ground member 40.

Solder and flux may easily be applied to the shield braid 16, the tabular portions then pressed against the braid and into the solder paste, and the Curie point heater activated by an RF current inducing electromagnetic activity in regions 45 for a selected limited time, with the thermal energy conducted by rearward extensions 44 to the solder paste to reflow the solder which will solidify defining the solder joints which will establish the ground connection between the cable's shield braid 16 and the shield ground of the connector. Optionally, inlays of solder may be previously adhered to tabular portions 44 on their braid-proximate surfaces, with flux then applied immediately prior to forming the solder joints.

Carrier strips 22 include a layer of metal having high magnetic permeability and high electrical resistance, such as Alloy 42 (42 percent nickel, 58 percent iron) of a thickness of between about 0.0003 and 0.0007 inches, such as by being clad onto the surface of carrier strip 22 which comprises preferably copper alloy such as Alloy No. C511000, phosphor bronze. Upon flux being applied to the termination sites in grooves 56, and upon the carrier strips being subjected to RF current for several seconds, the Curie point heater defined by each carrier strip 22 achieves a temperature of about 240° C. and conducts thermal energy along rear section 150 of terminals 20 to termination sections 28 to reflow solder 124 to form solder joints 170 between terminals 20 and conductors 106. Solder 124 can be for example Sn 63 tin-lead having a reflow temperature of about 183° C. Such Curie point heating by self-regulating temperature sources is disclosed in U.S. Pat. Nos. 4,852,252; 4,256,945 and 4,659,912, and RF generators are disclosed in U.S. Pat. Nos. 4,626,767 and 4,789,767. Localized heating of carrier strips 22 and only the vicinity adjacent exposed conductor portions 108 for several seconds needed to reflow the solder has the important benefits of the controlled maximum temperature in a highly localized area for a very brief time, minimizing any adverse effect of heat on the wire insulation for example.

Variations and modifications may be made to the shield ground of the present invention. For example, a ground plate such as is disclosed in U.S. Pat. No. 5,190,473 may be adapted to define rearward extensions to extend to a shielding braid of the cable containing a plurality of microcoaxial conductor wires; the ground plate thus can serve as the ground circuit for the cable shield as well as for the ground conductors of the discrete microcoaxial conductor wires, and continue to provide a convenient wire carrier during connector assembly.

Other modifications may occur to the integral connector shield ground of the present invention which are within the spirit of the invention and the scope of the claims.

What is claimed is:

1. An electrical connector assembly for termination to ends of a plurality of discrete insulated conductor wires of a shielded cable to define a wire harness, comprising:

a connector subassembly including a dielectric front cover member having a plurality of passageways extending therethrough from a rearward fact to a mating face in which are disposed a plurality of terminals for contact sections to be at least exposed along said mating face for electrical connection with a corresponding electrical article, each signal one of said terminals including a rearward section exposed along a rearward face of said front cover member for termination to a respective said conductor;

a body member adapted to be mounted to said front cover member upon connector assembly, said body member including a planar section extending to a rearward end and including outwardly facing side surfaces defining wire-receiving regions along which will be secured ends of said wires of said shielded cable;

said body member including at least integrally affixed thereto a conductive shield ground section isolated from signal conductors of said wires upon securing thereof in said wire-receiving regions and including at least one section extending rearwardly from said body member to a respective tabular free end portion positioned and shaped to coextend along an end portion of the cable and along an exposed end portion of a shielding braid thereof, and further including at least one ground contact section at least exposed along a forward end of said body member for eventually grounding said conductive shield ground section to a corresponding ground circuit of said mating electrical article, whereby ends of said wires are securable to said body member defining a wire-carrying subassembly movable forwardly as a unit to said front cover member for termination of said rearward sections of said signal terminals to signal conductors of said wires, and said conductive shield ground section is easily terminated to said shielding braid of the cable, assembling said wire-carrying subassembly to said connector subassembly defining a connector assembly having an integral ground for said shielding braid.

2. A connector assembly as set forth in claim 1 wherein at least a portion of said conductive shield ground section includes a first layer of a first metal having low magnetic permeability and low electrical resistance, and a second layer intimately joined to said first layer at a selected location of a second metal having high magnetic permeability and high electrical resistance and having a thickness of between 0.0003 and 0.0007 inches.

3. A connector assembly as set forth in claim 1 wherein each said at least one ground contact section extends forwardly to be disposed along a respective location in said wire-receiving region to be terminated to a corresponding terminal of said connector subassembly, upon assembly of said wire-carrying subassembly to said connector subassembly.

4. A connector assembly as set forth in claim 1 wherein said conductive shield ground section includes an opposing pair of said sections extending rearwardly to respective tabular portions for being terminated to said shielding braid on opposing sides of said cable.

5. A wire-carrying subassembly mountable to a rearward face of a connector subassembly having a front cover member in passageways of which are disposed terminals signal ones of which all having rearward sections exposed along the rearward face thereof to be electrically connected to conductors of a shielded multi-wire cable, the wire-carrying subassembly comprising:

a body member adapted to be mounted to said connector subassembly, said body member including a planar section extending to a rearward end and including outwardly facing side surfaces defining wire-receiving regions adapted for ends of wires of the cable to be secured thereto for signal conductor portions to be disposed adjacent a forward edge thereof to be terminated to respective said signal ones of said terminals, said body member including a conductive shield ground section isolated from said wire-receiving regions and including at least one section extending rearwardly from said body member to a respective tabular free end portion positioned and shaped to coextends along an end portion of the cable and along an exposed end portion of a shielding braid thereof, and further including at least one ground contact section at least exposed along said forward edge of said body member for ground connection to a ground means of said connector subassembly for eventually grounding said conductive shield ground section to a ground circuit of said mating electrical article, whereby ends of said wires are securable to said body member defining a wire-carrying subassembly movable as a unit forwardly to said connector subassembly for termination of said rearward sections of said signal terminals to respective said ends and termination of said at least one ground contact section to said ground means, and said conductive shield ground section is easily terminated to said shielding braid of the cable, defining a connector assembly having an integral ground for said shielding braid.

6. A connector assembly as set forth in claim 5 wherein at least a portion of said conductive shield ground section includes a first layer of a first metal having low magnetic permeability and low electrical resistance, and a second layer intimately joined to said first layer at a selected location of a second metal having high magnetic permeability and high electrical resistance and having a thickness of between 0.003 and 0.0007 inches.

7. A connector assembly as set forth in claim 5 wherein each said at least one ground contact section extends forwardly and along a respective location of said wire-receiving region to be terminated to a corresponding terminal of said connector subassembly, upon assembly of said wire-carrying subassembly to said connector subassembly.

8. A connector assembly as set forth in claim 5 wherein said conductive shield ground section includes an opposing pair of said sections extending rearwardly to respective tabular portions for being terminated to said shielding braid on opposing sides of said cable.

9. A method of assembling an electrical connector to a multiwire shielded cable for mating with another electrical article, comprising the steps of:

providing a connector subassembly of a dielectric member having signal terminals secured therein with rearward sections of said signal terminals exposed for termination to signal conductors of wires of the cable, providing a body member having outwardly facing side surfaces defining wire-receiving regions and including at least integrally affixed thereto between said side surfaces a conductive shield ground member isolated from signal conductors upon assembly of said wires in said wire-receiving region, said conductive shield ground member including at least one rearward extension concluding in a tabular portion positioned and shaped to coextend along an exposed end of the shielding braid of the cable upon assembly to said cable, and said conductive shield ground member further including at least one ground contact section at least exposed along a forward edge of said body member for eventually grounding said conductive shield ground member to a corresponding ground circuit of said mating electrical article;

securing ends of the wires to said body member at said wire-receiving region with signal conductor portions disposed adjacent a forward end of said body member and at least positioning said at least one tabular portion along said shielding braid to be terminated thereto, defining a wire-carrying subassembly;

terminating said at least one tabular portion to said shielding braid; and urging said wire-carrying subassembly forwardly to said connector subassembly to terminate said signal terminal rearward sections to respective ones of said signal conductor portions.

10. The method as set forth in claim 9 wherein said step of providing a body member comprises insert molding a plastic body portion securely to and around at least substantial portions of a discrete conductive shield ground member in a manner exposing at least said at least one tabular portion and said at least one ground contact section.

11. The method as set forth in claim 10 wherein said at least one ground contact section initially is formed to extend from said conductive shield ground member remote from said plastic body portion and is subsequently re-formed to be positioned along an exposed surface thereof at a selected location in said wire-receiving region to be subsequently terminated to a ground circuit of said connector subassembly.

12. The method as set forth in claim 9 wherein said shield termination step is soldering.

13. The method as set forth in claim 12 wherein at least a portion of said conductive shield ground section is provided with a first layer of a first metal having low magnetic permeability and low electrical resistance and a second layer intimately joined to said first layer of a second metal having high magnetic permeability and high electrical resistance and an incremental thickness, defining a Curie point heater, and said step of soldering is performed by applying a constant amplitude high frequency current to said conductive section of a frequency to induce a corresponding frequency therein for a sufficient brief time to generate thermal energy to be conducted to said tabular portions and solder placed thereat for reflowing the solder.

* * * * *